United States Patent [19]
Madonna et al.

[11] Patent Number: 5,596,569
[45] Date of Patent: Jan. 21, 1997

[54] TELECOMMUNICATIONS SWITCH WITH IMPROVED REDUNDANCY

[75] Inventors: Robert P. Madonna, West Barnstable; Siegmar K. Eschholz, Monument Beach; John T. Lynch, Buzzards Bay, all of Mass.

[73] Assignee: Excel, Inc., Hyannis, Mass.

[21] Appl. No.: 590,688

[22] Filed: Oct. 10, 1995

Related U.S. Application Data

[63] Continuation of Ser. No. 207,921, Mar. 8, 1994, abandoned.

[51] Int. Cl.$^6$ .......................... H04Q 11/00; G06F 11/00
[52] U.S. Cl. .................. 370/217; 370/360; 340/827; 340/825.83; 395/182.01; 395/183.19
[58] Field of Search .................. 370/13, 14, 16, 370/54, 58, 1, 58.2, 58.3, 85.1, 85.7, 85.8, 85.9, 85.11, 95.1, 95.2; 340/825.03, 826, 827, 825.06, 825.08, 825.79, 825.8, 825.83; 379/268, 271, 272, 273, 279, 291, 333, 335; 395/180, 181, 182.01, 182.02, 183.16, 183.17, 183.19

[56] References Cited

U.S. PATENT DOCUMENTS

| | | | |
|---|---|---|---|
| 4,393,493 | 7/1983 | Edwards | 370/16 |
| 4,497,054 | 1/1985 | Read | 370/16 |
| 4,905,220 | 2/1990 | Junge et al. | 379/279 |
| 5,010,550 | 4/1991 | Hirata | 371/8.2 |
| 5,014,269 | 5/1991 | Picandet | 370/85.11 |
| 5,038,320 | 8/1991 | Heath et al. | 371/11.1 |
| 5,150,355 | 9/1992 | Dyer | 370/16 |
| 5,198,808 | 3/1993 | Kudo | 340/827 |
| 5,321,393 | 6/1994 | Carlton et al. | 370/16 |

FOREIGN PATENT DOCUMENTS

| | | |
|---|---|---|
| 0350674 | 1/1990 | European Pat. Off. |
| 0350402 | 1/1990 | European Pat. Off. |
| 0358597 | 3/1990 | European Pat. Off. |
| 0402055 | 12/1990 | European Pat. Off. |
| 2004440 | 3/1979 | United Kingdom |
| 2014018 | 8/1979 | United Kingdom |
| 9408430 | 4/1994 | WIPO |
| 9416528 | 7/1994 | WIPO |

OTHER PUBLICATIONS

Research Disclosure, No. 339, Jul. 1992, EMSWORTH (GB) p. 529, XP316629 'Circuit card with contacts of five different lengths for gradual current change when card is plugged in or unplugged'.

IBM Technical Disclosure Bulletin, vol. 35, No. 5, Oct. 1992, ARMONK (US) pp. 391–394, XP313021 'Method for card "HOT PLUG" detection and control'.

*Primary Examiner*—Alpus H. Hsu
*Attorney, Agent, or Firm*—Cesari and McKenna, LLP

[57] ABSTRACT

A programmable telecommunications switch has automatic backup of line cards to provide complete redundancy. The switch has I/O cards which terminate the external telecommunications spans. Each I/O card passes the data from its spans to a line card. When the line card fails, the I/O card switches the data onto an I/O bus which is connected to a standby I/O card. The standby I/O card switches a standby line card into connection with the I/O bus such that the data stream is then serviced by the standby line card. The failed line card may then be removed and replaced. All I/O cards are attached to the I/O bus such that redundancy for all active line cards using the same signalling protocol is provided with a single standby line card. With multiple I/O busses, standby I/O cards and standby line cards, multiple redundancy is possible. Finally, the failure of a single line module of a line card may be handled by switching only the span serviced by that module to a standby line card. Spans from different I/O cards may be serviced by different line modules of a single standby line card, and may be all connected to the same standby line card by the same bus.

26 Claims, 7 Drawing Sheets

TELECOMMUNICATIONS SWITCH WITH IMPROVED REDUNDANCY

This application is a continuation of U.S. patent application Ser. No. 08/207,921, filed Mar. 8, 1994, now abandoned.

BACKGROUND OF THE INVENTION

1. Field of the Invention

The present invention relates generally to the field of telecommunications and, more specifically, to programmable telecommunications switches having improved redundancy features.

2. Discussion of the Prior Art

Programmable switches for switching time division multiplexed (TDM) telecommunications signals are used in a wide variety of applications such as voice messaging, telemarketing services and the like. A programmable switch is usually controlled by a host device, which is typically a computer that runs a telecommunications application program. A customer may either purchase a commercially available application program that is compatible with the host and switch hardware, or may elect to write a custom program.

A modern telecommunications switch is typically organized with voice and data traffic all being routed along a central TDM bus. Interfaces to the public switched telephone network, (PSTN) are grouped onto circuit boards or "line cards" along with control circuitry for handling the traffic coming through that card. Different line cards may include different interfaces for supporting various signalling protocols, including T1, E1 and J1. In any system, there may be a combination of line cards each of which may carry T1, E1, J1, DS3, SONET or analog signals.

All of the line cards receive instructions from a central processing unit (CPU), often a microprocessor, along a high level data link control (HDLC) bus. Each line card has a designated slot in a passive backplane or motherboard into which it mounts, and a connector which establishes the appropriate signal paths between the card and the TDM bus when the card is mounted in the slot. Incoming communications signals are transmitted onto the TDM bus via the line cards, and are switched to the appropriate outgoing port which may or may not be located on another line card. All of the traffic on the TDM bus is controlled by the CPU, which responds to messages from the host. The CPU controls the routine switching of the voice and data traffic through a switching matrix, typically a time slot interchange.

Usually a switch has a number of line cards, all transmitting data simultaneously. If one of the line cards should fail, the data stream which was previously channeled through that card must be rerouted through a backup card by replacing it with a new card. Otherwise, switching to the spans supported by the failed card are completely lost.

SUMMARY OF THE INVENTION

A programmable telecommunications switch has a switching matrix for dynamically connecting communications paths between a plurality of ports in response to a switching signal from a data processor (or "CPU"). The switch uses line modules (typically mounted on circuit boards or "cards") which can receive a telecommunications signal and intermittently transmit the signal to the switching matrix. An input device which terminates a telecommunications span has multiple connection modes in which it can connect the span to different parts of the switch.

In a first connection mode, the input device connects the span in a communicating relationship to a first line module. However, if the first line module should fail, this failure is detected by the CPU which sends a "changeover" signal to the input device instructing it to switch to a second mode. In the second mode the input device connects the span in a communicating relationship to a second line module which functions in place of the failed first line module.

Typically, when the input device is in the second mode, the spans are connected to the second line module via an input connector, or I/O bus, and a standby input device. The standby input device also has multiple connection modes. In a first mode the standby input device connects the second line module to the I/O bus. In a second mode, the standby input device disconnects the second line module from the I/O bus. The standby input device is instructed to change modes by a "standby" signal which it receives from the CPU. After a line module fails, the CPU first instructs the standby input device to connect the second line module to the I/O bus. The input device is then instructed to connect its span to the I/O bus. Since each of the standby and changeover signals generated by the CPU are particular to one input device or standby input device, respectively, the CPU can individually instruct each device.

The line modules of the invention are preferably organized in separate groups, each group making up a line unit. Similarly, the input devices are preferably organized in separate groups, each group making up an input unit and servicing one line unit. Likewise, the standby input devices are organized in groups, each making up a standby input unit and servicing one line unit. In the preferred embodiment, each of the line unit, the input unit and the standby input unit constitutes a printed circuit board on which the elements of that unit are located. These circuit boards are referred to, respectively, as "line cards", "I/O cards" and "standby I/O cards". While the line modules, input devices and standby input devices can function independently, a preferred embodiment of the invention provides that each line unit, input unit and standby input unit is inserted and removed from the system as a whole.

In one embodiment of the invention, there are multiple standby input units connected to the I/O bus, and each services a different line unit. When there is a failure of an entire line unit, the CPU instructs one of the standby input units to connect its line unit to the I/O bus. The input unit which services the failed line unit is then instructed by the CPU to connect its span to the I/O bus.

If the newly operational line unit subsequently fails, another standby input unit is instructed by the CPU to connect its line unit to the I/O bus. The standby input unit which services the newly failed line unit is instructed to change modes and disconnect the newly failed line unit from the I/O bus. Thus, the second failure is also handled by rerouting the data stream along the I/O bus.

In another embodiment, the switch includes multiple input units each servicing a line unit, multiple standby input units each servicing a line unit and multiple I/O busses. This provides multiple levels of redundancy for the line units serviced by the input devices. When one of those line units fails, the CPU instructs one of the standby input units to change modes to connect its line unit to a particular I/O bus. The CPU then instructs the input unit which services the failed line unit to connect its span to the same I/O bus. Thus, the telecommunications signal is serviced by a line unit via that particular I/O bus.

If, subsequently, another line unit serviced by an input unit fails, a different standby input unit is instructed to connect the line unit it services to an I/O bus which is not in use. The CPU then instructs the input unit servicing the newly failed line unit to connect its span to that same I/O bus. Thus, a second telecommunications data stream is automatically rerouted from a failed line unit to another line unit.

Another embodiment of the invention includes the switching of individual spans from different input units to the same standby line unit along the same I/O bus. When a line module on a first line unit fails, the failure is detected by the CPU. A first input device on a first input unit which connects a first telecommunications span to the failed line module is then instructed by the CPU to change connection modes to connect the first span to the I/O bus. A first standby input device of the standby input unit is then instructed by the CPU to connect a first line module of the line unit it serves to the I/O bus. This results in the first data stream being connected in a communicating relationship with the first line module of the standby line unit.

When a line module on a second line unit then fails, the failure is detected by the CPU. An input device on a second input unit which connects a telecommunications span to the second failed line module is instructed by the CPU to change connection modes to connect the second span to the I/O bus. A second standby input device of the standby line unit is then instructed by the CPU to connect a second line module of the line unit it services to the I/O bus. This results in the second data stream being connected in a communicating relationship with the second line module of the standby line unit.

In each of the switch embodiments, the switch is constructed such that, when an input unit has disconnected the line unit it services, that line unit can be removed from and inserted into the switch without disrupting the transmission of the telecommunications signal from the spans of the input unit to a second line unit. Each line unit is preferably located on its own printed circuit board which may be inserted and removed from the switch. The board has an edge connector by which the line unit makes connection with the CPU and the input unit. The switch also includes a power source with which the line unit makes connection via the edge connector. A pre-charge power source may be included which, upon insertion of a line unit into the switch, provides power to the line unit before the line unit receives power from the power source. This prevents a large fluctuation of a signal generated by the power source due to contact with an unpowered line unit. The power source and the pre-charge power source (both preferably busses) may both receive their power from a power unit (or power card) of the switch. Typically, multiple power units are present so that if one fails, power to the switch is not interrupted.

Each of the switch embodiments preferably includes a surge protector in each of the input units and the standby input units. The surge protectors are located such that a telecommunications signal passes through the surge protector of a unit only when that (input or standby input) unit is connecting the signal to a line unit it services. Thus, when an input unit changes modes to connect its span to an I/O bus, the surge protector of that input unit is bypassed. However, the telecommunications signal from the span must then pass through the surge protector of the standby input unit that connects its line unit to the I/O bus.

The switches are such that they may handle any of the T1, E1, or J1 signalling protocols. Typically, the CPU is a microprocessor which gives addresses to each of the line units, input units and standby input units. Each of the line units, input units and standby input units also has a hardware device from which the CPU may retrieve information which identifies that unit. The CPU periodically polls the addresses given to these components, by sequentially generating polling signals which incorporate the addresses to enable the outputs of each unit. In one embodiment, the CPU detects a malfunction in a line unit when it is unable to read the identifying information out of the unit after polling its address. Each of the switches of the preferred embodiments provides redundancy of the CPU by having multiple CPUs. One CPU is active at a time and a backup CPU takes over the data processing functions if the first one fails.

The switches described above may also include a digital signal processor (DSP) and a packet engine. Multiple DSPs and packet engines are preferable so that if an active one of them fails, the tasks it performed can be automatically reassigned to another by the CPU. Thus, the desired DSP and packet engine functions are not lost by a single failure. As can be seen, with the multiple CPUs, power sources, DSPs, and packet engines, and the line unit arrangement of the present invention, the switches are fully redundant. That is, if any single component within one of them fails, the switch nonetheless continues to operate.

DETAILED DESCRIPTION OF A PREFERRED EMBODIMENT

Figure 1:
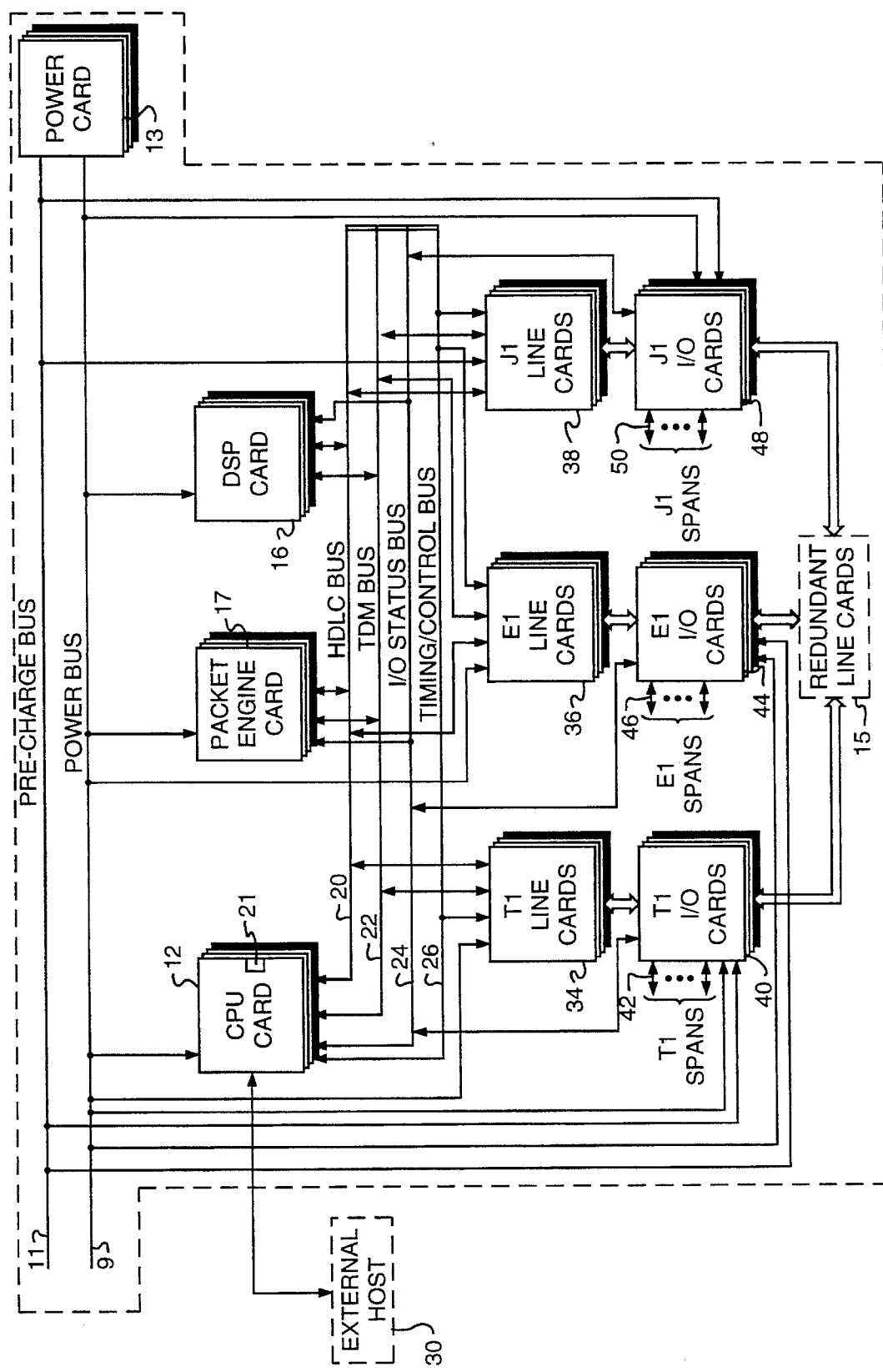
FIG. 1 is an schematic overview of a programmable telecommunications switch according to the present invention.

Shown in FIG. 1 is a programmable telecommunications switch 10. The switch is constructed on circuit boards or "cards" which are located in slots on a passive backplane. Alternatively, the boards may instead be located within a personal computer in the slots of a motherboard of the computer. The slots of the backplane contain edge connectors which, when the cards are inserted, provide connection between the cards and the appropriate busses of the switch 10. When each card is plugged into a slot, conductors on its surface make connection with those busses to which that card needs access.

The busses of the switch include a high level data link control (HDLC) bus 20, a time division multiplexed (TDM) bus 22, an I/O card (I/O) status/control bus 24 and a timing/control bus 26. A power bus 9 is provided which provides power to all of the cards. In addition, a pre-charge bus 11 is provided which is a power source that is arranged in the backplane so that when a card is plugged into a slot the card comes into contact with the pre-charge bus 11 first. This prevents the card being inserted from causing unwanted fluctuations in the power signal of power bus 9, which might disrupt the system if the new board was inserted while the system was operational. It also allows the card being inserted to receive power before receiving data, so that its internal components are properly initialized.

Both the power bus 9 and the pre-charge bus 11 receive their power from power card 13. As indicated in FIG. 1, there are actually multiple power cards 13 to provide redundancy if one of them fails. In the preferred embodiment, there are two power cards 13 and, while both are functioning properly, each supplies one-half of the necessary power to power bus 9 and pre-charge bus 11. If one of the power cards 13 should fail, then the other card responds by providing all of the required power.

A CPU card 12 is interconnected with digital line cards 34,36,38 and input/output (I/O) cards 40,44,48 which terminate T1, E1 and J1 spans, respectively. In FIG. 1, the line cards for each signalling protocol are shown together, the T1 line cards being indicated at 34, the E1 cards at 36 and the J1 cards at 38. The T1 line cards 34 support communications signals transmitted in accordance with the North American signalling protocol, while the E1 line cards 36 and the J1 line cards 38 support the European protocol and the Japanese protocol, respectively. Multiple line cards of each type may be included in the switch subject to two limitations: (1) the maximum switching capacity of the CPU card 12; and (2) the physical space within the chassis.

On the CPU card 12 are a central processing unit (CPU), preferably a Motorola 68302 microprocessor, and a time slot interchange (TSI) matrix 21 for doing the actual time switching of the communications traffic on the TDM bus 22. The CPU controls the mapping for the time switching, and sends messages to the line cards 34, 36, 38 along the HDLC bus 20 to instruct them in placing data on the TDM bus 22. Each line card preferably has a processor which communicates with the CPU on the CPU card 12 and controls its own bidirectional flow of data in response to messages from the CPU. In this manner, the CPU controls all of the data on the TDM bus 22.

As indicated in FIG. 1, there are actually two CPU cards 12. A secondary CPU card 12 operates in a standby mode and provides redundancy should the primary CPU card fail. The secondary CPU card receives all of the telecommunications data which is received by the active CPU, and performs all of the same switching functions using its own TSI matrix 21. However, while the primary CPU card is functioning properly, the secondary CPU card does not have access to the switching and control busses 20,22,24,26 (i.e. its outputs to the busses are disabled).

The secondary CPU card is able to detect when the primary CPU card has failed, and takes control of busses 20,22,24,26 when that occurs. While the same busses 20,22, 24,26 may be used by both the primary and the secondary CPU, in the preferred embodiment an extra set of bus conductors is used which link the switch components in the same manner as busses 20,22,24,26. These secondary bus conductors are used by the secondary CPU when the primary CPU fails. This allows full redundancy even in the case of a failure of one of the busses 20,22,24,26.

An external host 30, which may comprise a personal computer or workstation or other type of computer, is connected to the CPU card 12 via a conventional RS-232 compatible interface. The host 30 preferably operates under an application-oriented operating system. The host 30 instructs the CPU card 12 in the configuring of the switch 10, while the CPU card 12 handles all the routine switching operations.

Also located in the switch 10 is a digital signal processing (DSP) card 16 and a packet engine card 17. The DSP card 16 operates in cooperation with the CPU card 12 to provide functions such as tone generation or detection, call progress analysis, playback of a recorded announcement and the like. The packet engine card 17 provides support for ISDN signal interpretation and other packet communications services.

As indicated in FIG. 1, there are actually multiple DSP cards 16 and multiple packet engine cards 17. These multiple cards provide redundancy for their special features. The multiple DSP cards 16 all operate simultaneously. When a DSP task is required, the CPU card 12 assigns it to one of the DSP cards 16. Other DSP tasks are distributed equally between all the DSP cards 16. Should one of the DSP cards 16 fail, the CPU card 12 no longer assigns any further DSP tasks to the failed card. The remaining cards then receive a higher proportion of necessary tasks to compensate for the failed card. In contrast, the packet engine cards 17 provide redundancy in a manner similar to that of CPU cards 12. Only one packet engine card 17 is operational at a time. If that card fails, the CPU brings the standby packet engine card into service.

As shown, T1 spans are terminated on T1 I/O cards 40, E1 spans are terminated on the E1 I/O cards 44 and J1 spans are terminated on the J1 I/O cards 48. In a typical switch embodiment, telecommunication signals from multiple spans are handled on one card. As with the line cards, the I/O cards for each protocol are shown together, each set of I/O cards feeding an incoming data stream to its set of line cards. In the figures, the paths carrying the T1, E1 or J1 data (typically 32 conductors) are shown as double-line connections to distinguish them from the other connectors. As shown in FIG. 1, the I/O cards 40,44,48 are connected to a set of redundant line cards which are generally indicated at 15. These redundant cards are shown in more detail in FIG. 2.

Figure 2:
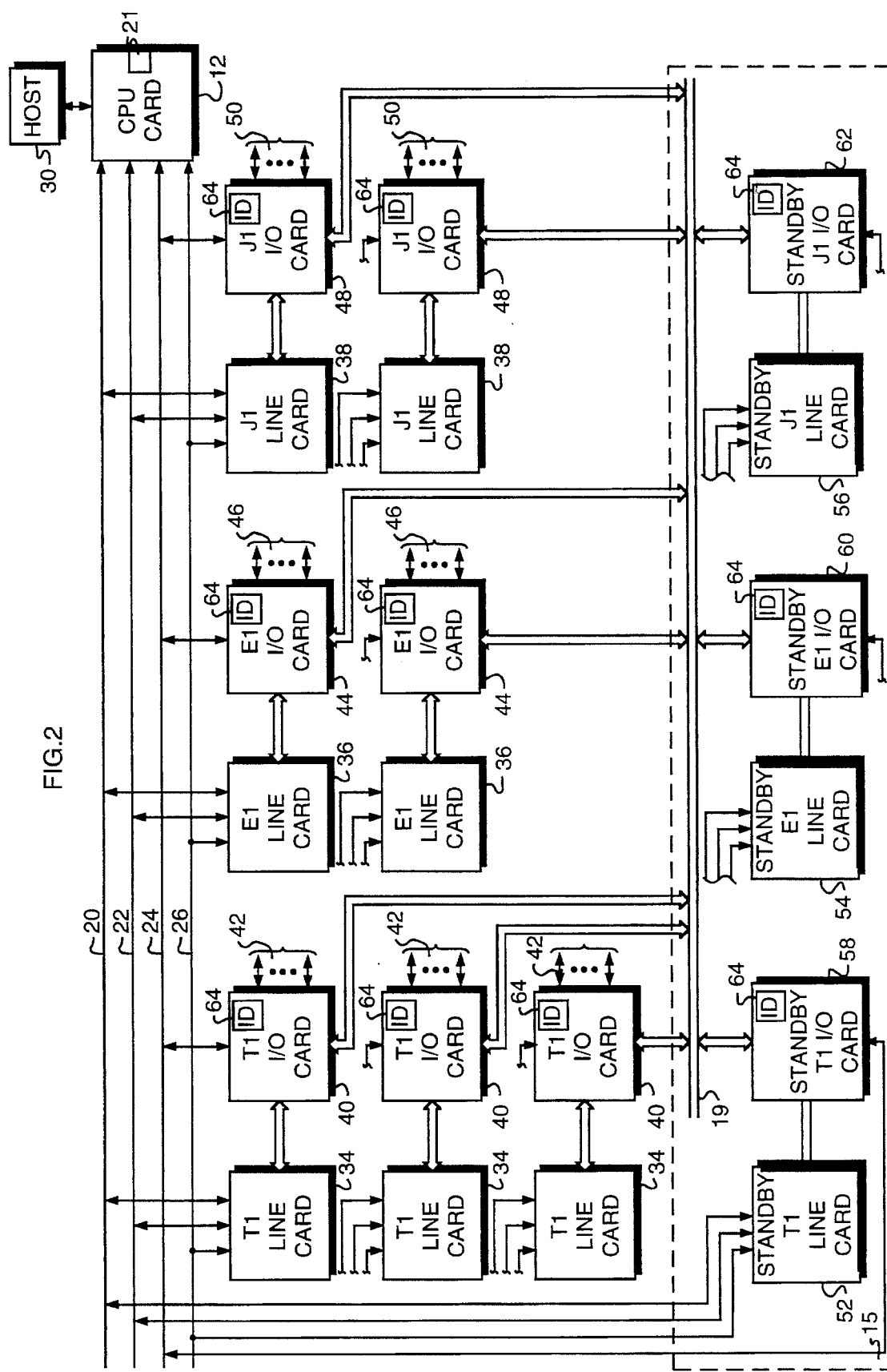
FIG. 2 is a more detailed schematic of the line cards and I/O cards of the switch of FIG. 1.

FIG. 2 shows the I/O cards and line cards of the switch 10 in more detail. For simplicity, the power bus 9 and the precharge bus 11 are not shown in FIG. 2, but it should be understood that each of the cards of the switch is connected to these two busses. Furthermore, the multiplicity of the CPU card 12 is not indicated in FIGS. 2, 3 and 7, but it should be understood that the multiple CPU card 12 redundancy nonetheless exists in the switch arrangements of these figures as well as in that of FIG. 1.

As mentioned previously, cards of different types may run simultaneously in the switch 10. In the embodiment of FIG. 2, the switch has three T1 line cards 34, two E1 line cards 36 and two J1 line cards 38. It will be understood by those skilled in the art that more or fewer of each card may be used (subject to the limitations mentioned previously) without exceeding the scope of the invention. Each line card receives data of its protocol type (T1, E1 or J1) via its associated I/O card. For example, the T1 I/O cards 40 receive T1 data from T1 spans 42, and pass such data to the T1 line cards 34. Similarly, the E1 I/O cards 44 deliver E1 data from E1 spans 46 to E1 line cards 36, and the J1 I/O cards 48 deliver J1 data from J1 spans 50 to J1 line cards 38. Each line card handles data from multiple spans with groups of circuit components (line modules) which operate in parallel, each on a data stream from a different span. The data received by each line card is then placed on the TDM bus in response to messages from the CPU card 12.

Since the failure of a line card can be catastrophic to the switch 10, a redundancy feature for the line cards is highly desirable, as it is for all switch components. The present invention provides such a redundancy in the form of I/O bus 19 and standby line cards 52, 54 and 56, corresponding to the T1, E1 and J1 protocols, respectively. Each of the standby line cards 52,54,56 has a corresponding standby I/O card 58,60,62. The I/O bus 19 consists of 32 conductors, and so is capable of carrying either T1, E1 or J1 data. Similar conductors connect each of the I/O cards 40,44,48 and each of the standby I/O cards 58,60,62 to the I/O bus 19.

In FIG. 2, each of the line cards and I/O cards is connected to the busses 20,22,24,26 to which it needs access. For clarity in the figure, many of these connection lines have been truncated, although the connections for one of each type of card are shown in full. The other cards of the same type are connected in the same way via the truncated connection lines shown in the figure. In the switch 10, all of the cards (active and standby line cards, active and standby I/O cards, CPU cards, power cards, DSP cards and packet engine cards) are "hot insertable." In other words, each of these cards may be inserted into and removed from their slots in the backplane without disrupting the operation of the remainder of the switch 10. This is due in part to the use of pre-charge bus 11, but also to system architecture which allows each card to function as if it was in isolation from the other cards of the switch. The CPU cards, power cards, DSP cards and packet engine cards simply connect to common busses of the switch via edge connectors. Similarly, the I/O cards connect only to common busses of the switch, and (when they are not carrying incoming telecommunications data) may be inserted and removed without disrupting switch operation. The hot insertability of the line cards is described more fully below.

The isolation of each line card is possible because each line card 34,36,38 uses a different pair of conductors on the TDM bus 22. Since the TDM communication between a line card and the CPU card 12 is two directional, one set of conductors on the TDM bus is used for transmitting data from the line cards to the CPU card 12, while a second set of conductors of the TDM bus 22 is used to transmit data from the CPU card 12 to the line cards 34,36,38. Each of the line cards make connection with each of the conductors on the TDM bus when it is plugged into a slot. The CPU card then assigns a different pair of conductors on the TDM bus 22 exclusively to each of the line cards 34,36,38. Thus, any line card may be inserted into any line card slot and still be assigned to any of the TDM bus conductors. However, since each conductor pair is dedicated to a particular line card, the insertion or removal of a line card does not disturb the TDM bus communications of the other line cards.

Within each of the I/O cards 40,44,48 is a switch which is capable of connecting all or some of the spans it terminates to either its associated line card or to the I/O bus 19. During normal operation of the system (i.e. no failed line cards), the I/O bus 19 is not used, and all of the I/O cards 40,44,48 connect incoming data to their associated line cards. However, should one of the line cards fail, its I/O card is instructed by the CPU card 12 to switch the data stream onto the I/O bus 19, where it is redirected to one of the standby I/O cards 58,60,62. The current embodiment will consider only the switching of the data of all of the incoming spans together, as opposed to switching the data of only some of the spans.

Figure 3:
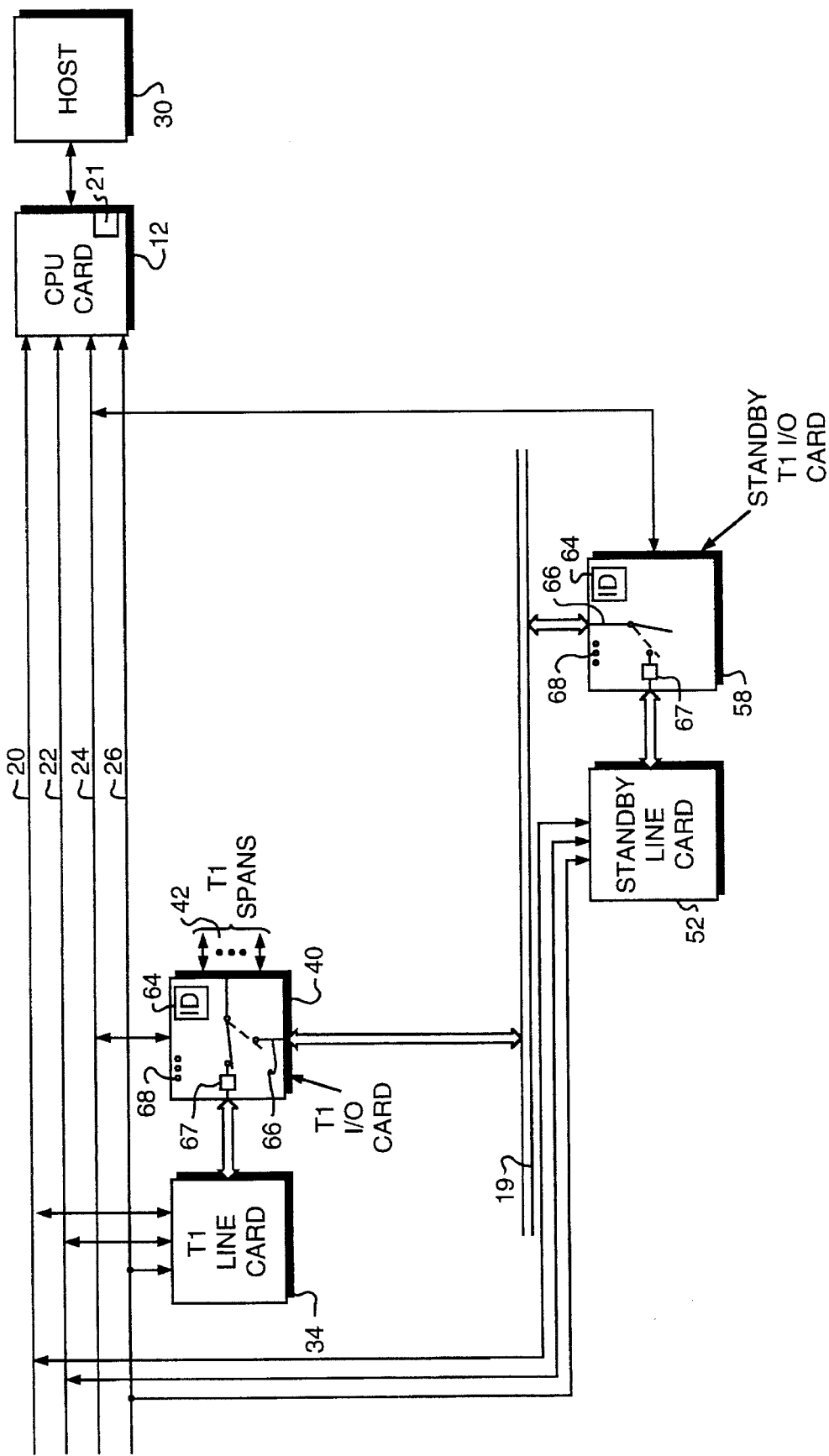
FIG. 3 is an isolated view of a demonstrative portion of the schematic of FIG. 2.

FIG. 3 is an isolated view of a single T1 line card 34, its I/O card 40, standby T1 line card 52, its standby I/O card 58 and I/O bus 19. This figure is provided to facilitate understanding of the line card redundancy of the present invention. T1 line card 34 and I/O card 40 are used in this example, but it will be understood that any of the T1, E1 or J1 I/O cards will function in the same manner in the event that their associated line card suffers a failure.

On each of I/O card 40 and standby I/O card 52 of FIG. 3 is shown a schematic representation of a single-pole double throw switch 66 which depicts the two directions in which an incoming data stream can be switched by the I/O cards. Those skilled in the art will understand that, although only one switch is shown per I/O card, each of the conductors carrying the T1 data can be switched from one output to the other individually. While the switching is done by relays in the preferred embodiments, it may also be done using other known electronic switching components.

When the switch 10 is functioning normally, the switches 66 of I/O card 40 and standby I/O card 58 are in the positions shown by the solid lines in the switch. Thus, the T1 data is being directed from T1 spans 42 to the T1 line card 34, and is kept isolated from I/O bus 19. At the same time, the standby I/O card 58 keeps standby T1 line card 52 disconnected from the I/O bus 19. Other incoming data (T1, E1 and J1) is also kept isolated from the I/O bus 19 by the other I/O cards 40, 44, 48 (shown in FIG. 2). Thus, the I/O bus is, at this time, completely idle.

Referring again to FIG. 3, when a failure occurs in T1 line card 34, the CPU card 12 detects an absence of responses to periodic polling of the failed line card along the HDLC bus 20, or is sent a failure message by the line card, and issues a corresponding message to host 30. In response to this message, the host 30 issues a "linecard switchover" message which specifies the two linecard slots to be switched from and switched to, respectively. In the present embodiment, this message directs the CPU card 12 to switch all the relays on I/O card 40 and standby I/O card 58, after verifying that the two cards are of compatible types. The standby I/O card 58 is switched first (to the switch 66 position shown by the dashed line) to put the T1 standby line card 52 in connection with the I/O bus 19. The I/O card 40 which serves line card 34 is then switched to the switch 66 position indicated by the dashed line, which results in the data stream from T1 spans 42 being directed onto I/O bus 19. With the standby T1 line card 52 receiving the data stream from T1 spans 42 (via I/O bus 19 and standby I/O card 58) it can then be configured by the host 30 as a new active line card. If the standby line card 52 was dedicated to backing up one particular line card 34, it could also be configured in advance to prevent any delay due to the configuring time.

To allow individual identification of the I/O cards by the CPU card 12, each of the I/O cards (including standby I/O cards 58,60,62) has information which is permanently fixed with regard to that card, including a serial number and a code indicating that board type. This is graphically depicted as an "ID label" 64 within the I/O card, but it should be recognized that the information is actually represented by a hardware device capable of being polled electronically by the CPU card 12. The serial numbers allow the CPU card 12 to tell one I/O card from another regardless of which slots they occupy. In addition to the serial number, each of the line cards, I/O cards, standby line cards and standby I/O cards is given an address by the CPU card 12 at system start up. The address given corresponds to the slot in the backplane in which that particular card resides. Individual addressing allows the outputs and inputs of each card to be enabled and disabled by the CPU card 12.

The I/O cards 40,44,48 and the standby I/O cards 58,60, 62 of the present invention are all equipped with surge protectors 67 to protect the line cards from power surges on the T1, E1 or J1 lines which might be caused by lightning or some other incident affecting the signal on the incoming spans. The surge protectors are of a type sufficient to satisfy F.C.C. Part 68 requirements, and are located on the line card side of each switch 66, for both the active and standby line cards. This location of the surge protectors 67 allows a data stream to be switched to a standby I/O card without the surge protector 67 of the source I/O remaining in the path of the data stream. Thus, if the surge protector 67 in the active I/O card is damaged, once the data stream is switched to the standby I/O card, the damaged surge protector is bypassed. Since the standby I/O card has its own surge protector 67, the system still complies with F.C.C. Part 68.

To provide an element of modularity to the switch 10, it is preferable to make all of the I/O cards with the same arrangement of edge connections so that each line card-I/O card pair may be inserted in any of the available line card-I/O card slot pairs of the backplane prior to system startup. Once all of the I/O cards are assigned an address by the CPU card 12, the switching of the I/O cards is done through software control (i.e. messages directed only to the addresses of the I/O cards to be affected using the I/O status/control bus 24).

The standby I/O cards differ from other I/O cards in that they effectively do only single-pole single-throw type switching. The permanent identifying information on each I/O card indicates whether it is a standard I/O card or a standby I/O card. Once the CPU card 12 has identified an I/O card as being a standby I/O card, it recognizes the slot of that card as being for standby operation, and the adjacent line card slot as containing a standby line card.

Each of the I/O cards (both active and standby) of the present embodiment has bicolor LEDs 68 which indicate the status of that card. When the CPU card 12 identifies an I/O card as being a standby I/O card, it issues a message to the associated line card to put that line card into standby mode. When a line card is in standby mode, such as standby T1 line card 52 before the failure of T1 line card 34, its I/O card verifies that it is in standby mode by flashing its LEDs green. This enables a user to visually identify which of the line cards are in standby mode.

When a line card fails, a user may remove and replace the failed card with an operational one. When the new line card is inserted into the vacant slot of the backplane, the CPU card 12 immediately puts it into standby mode. The host 30 may then instruct the CPU card 12 to put the new card into active service after giving it an address. For example, if the failed T1 line card 34 of FIG. 3 was replaced with an operational card, it would initially be put into standby mode. However, the host 30 could subsequently instruct the CPU card 12 to switch the relays 66 of I/O card 40 and standby I/O card 58 back to the position shown by the solid lines of FIG. 3. The new card would either have been pre-configured or would then be configured by the host 30 and put back into active status. As such, the LEDs 68 on the standby T1 card 58 begin to flash green once again. At this point, the I/O bus 19 would again be inactive, and the switch would be ready to handle another line card failure.

Figure 4:
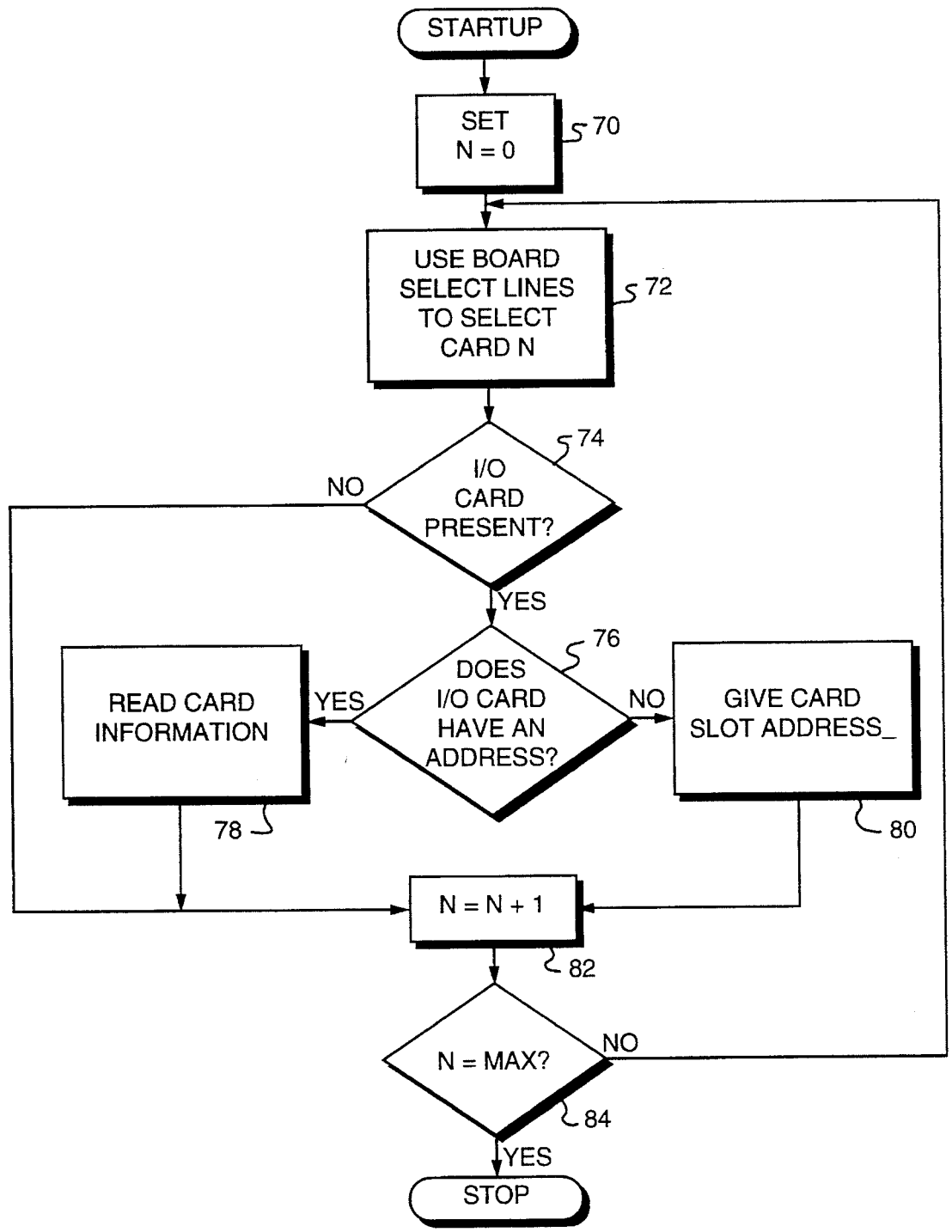
FIG. 4 is a flowchart showing the flow of logic in the CPU of the switch of FIG. 1 at the time of system startup.
Figure 5:
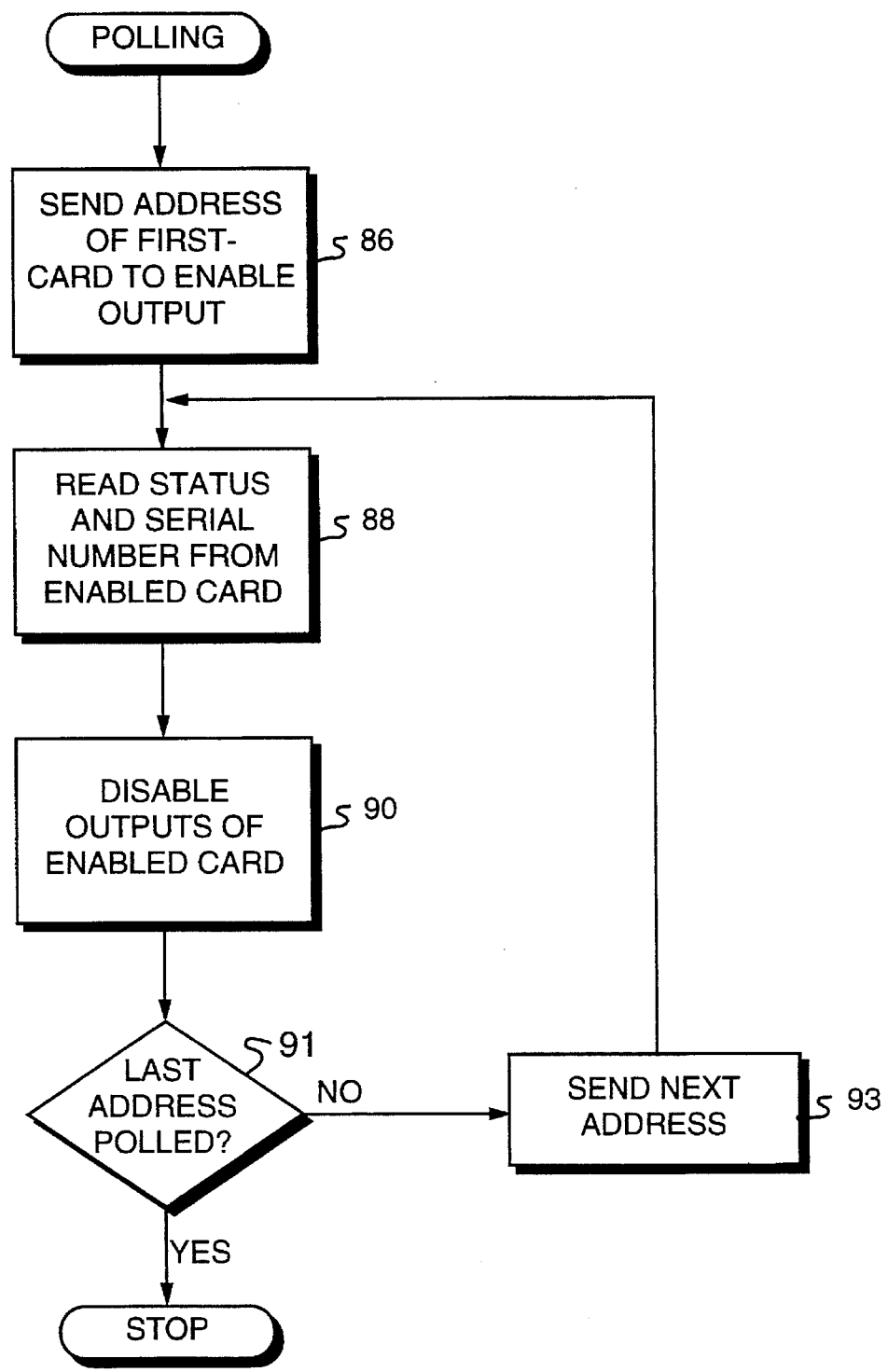
FIG. 5 is a flowchart showing the flow of logic in the CPU of the switch of FIG. 1 when polling the cards of the switch.
Figure 6:
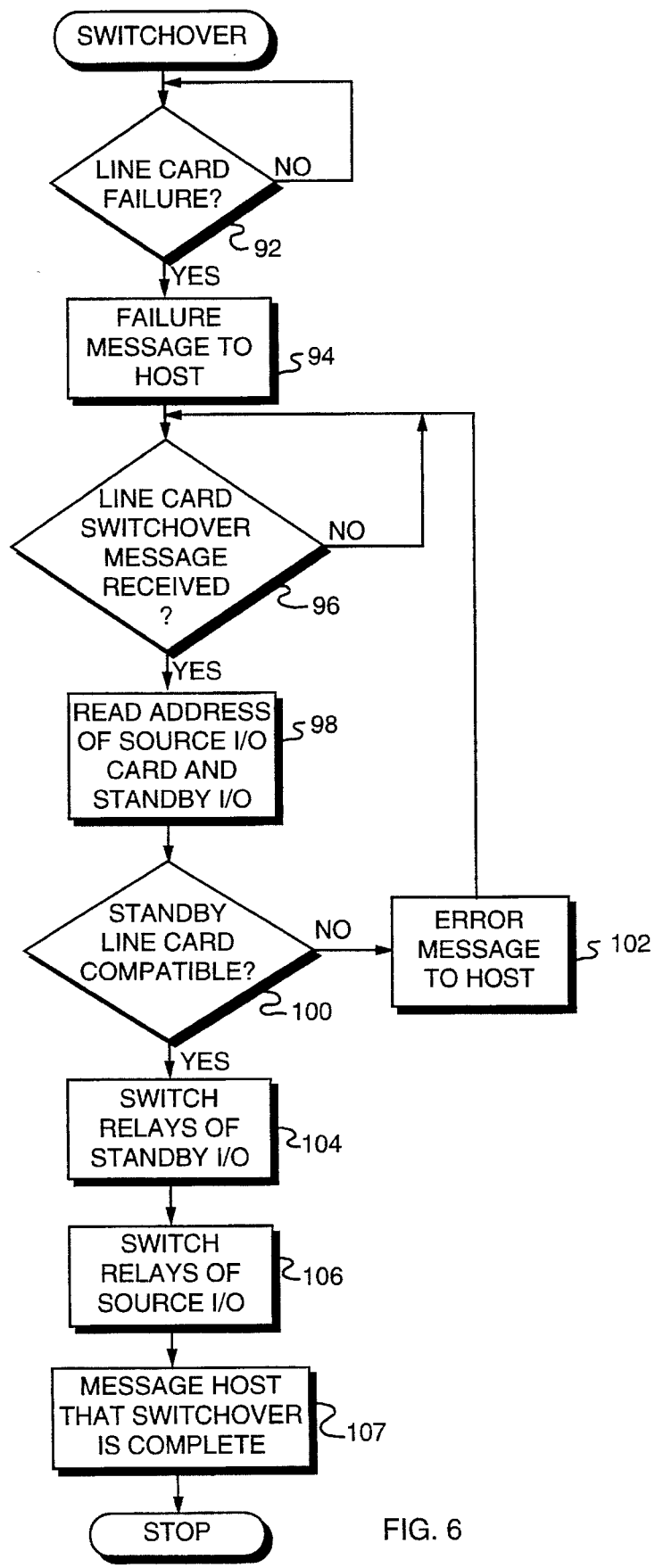
FIG. 6 is a flowchart showing the flow of logic in the CPU of the switch of FIG. 1 when a line card switchover is required.

FIGS. 4–6 are flowcharts which depict the logical steps performed by the CPU card 12 for the functions of startup and addressing I/O cards, checking the status of I/O cards and handling switchovers of failed line cards, respectively. This control information is provided in flowchart form to facilitate an understanding of the present invention, and it will be understood that suitable control logic may be implemented by any one of a number of well-known methods.

FIG. 4 shows the flow of logic in the CPU card 12 at the time the system is powered up. Since the different line card-I/O card pairs may be located in any of the different paired slots, it is necessary for the CPU card 12 to identify each of the cards and assign them addresses. This allows the CPU card 12 to quickly access the I/O cards later by using their assigned addresses. Initially, the boards are identified by their locations in the slots of the backplane, and the CPU card 12 must use particular access lines known as "card select lines" provided with the preferred embodiment which allows the CPU card 12 to individually access each of the slot pairs on the backplane. The card select lines are not shown as part of the bus structure in the figures, but these lines connect each line card-I/O card slot pair independently to the CPU by a different conductor. The slots are preferably accessed sequentially, and so an internal counter of the CPU is set to zero in block 70 of FIG. 4 before beginning the polling of the backplane slots.

The CPU uses the card select lines to access the first slot (block 72) and tests the slot to see if an I/O card (including a standby I/O card) is present (block 74). If no I/O card is present, the counter N is incremented (block 82) and the counter value is tested to see if the maximum value has been reached, i.e. all the slots have been polled (block 84). If not, the CPU uses board select lines to access the next sequential slot.

When it is determined that an I/O card is present in a slot (block 74), the CPU then checks to see if the card present in the slot has an address (block 76). This is the same function used for polling the slots. Since, at start up, none of the cards have addresses, all must be given an address. The step of block 78 is therefore not incurred during this startup procedure. When it is determined that the card does not already have an address, the CPU writes the address corresponding to the slot in which the card resides into an address register on the card (block 80). After writing the new address (block 80), the counter N is incremented and tested to see if all the slots have been accessed (blocks 82, 84). Once all of the slots have been accessed, the initialization program is terminated. At this time, all of the I/O cards and standby I/O cards have addresses which are known to the CPU card 12.

The CPU card 12 also regularly polls the I/O cards and the line cards to verify that they are still in operation. The polling involves reading the permanent information from each card one at a time. This allows the CPU to confirm the location and status of each line card and I/O card (active and standby), and also to detect when a line card has failed. When a line card is polled and does not respond within a predetermined period of time, the CPU sends a failure message to the host to advise it that the card has failed. The failure might also be detected by the CPU by a failure message sent to the CPU by the failed line card.

Shown in FIG. 5 is the logic flow of the CPU card 12 for reading the permanent information from the active and standby line cards and I/O cards. First the CPU sends out the address of the first card to be polled (block 86). This enables the outputs of a storage register on the addressed card which contains the permanent information. Using a clock signal from the timing/control bus 26, the CPU serially clocks out the desired information (block 88). Once the information is received and stored by the CPU card 12, the CPU disables the outputs of the polled card (block 90). It then checks to see if all cards have been polled (block 91) and if not, it sends the address of the next card to be polled (block 93). Once all the cards have been polled, the procedure stops until the next periodic polling.

FIG. 6 shows the logic flow of the CPU for a line card switchover. When a line card fails, the failure is detected by CPU card 12. As shown in the figure, the CPU is always ready to respond to such a failure (block 92). When a failure is detected, a corresponding line card failure message is issued to the host 30 (block 94). The CPU then awaits a line card switchover message from the host 30 (block 96). When a switchover message is received, the CPU reads the addresses of the failed line card and the standby line card contained in the message (block 98). The CPU then checks its memory for the stored parameters of these two line cards and determines whether they are compatible (block 100).

If the cards are incompatible, the CPU issues an error message to the host 30 (block 102) and awaits another switchover message. If the designated line cards are compatible, the CPU card 12 first switches the relays of the standby I/O card to connect the standby line card to the I/O bus 19 (block 104). The CPU card 12 then switches the relays of the I/O card which services the failed line card (block 106) to connect the incoming data stream to the I/O bus 19. At this point, the host 30 is notified that switchover is complete (block 107), and the host 30 may send instructions to configure the standby linecard as necessary, if the card has not been preconfigured.

As shown in FIG. 2, because of the incompatibility of different signalling protocols handled by switch 10, it is necessary to have a different standby I/O card and standby line card for each protocol. However, only one standby I/O card and standby line card pair provides redundancy for all line cards of a similar type. Furthermore, each of these standby systems utilizes the same I/O bus 19. Because of the present invention's ability to address all I/O cards, the system is made modular, and the I/O and line card pairs may be inserted in any of the pairs of slots in the backplane.

Figure 7:
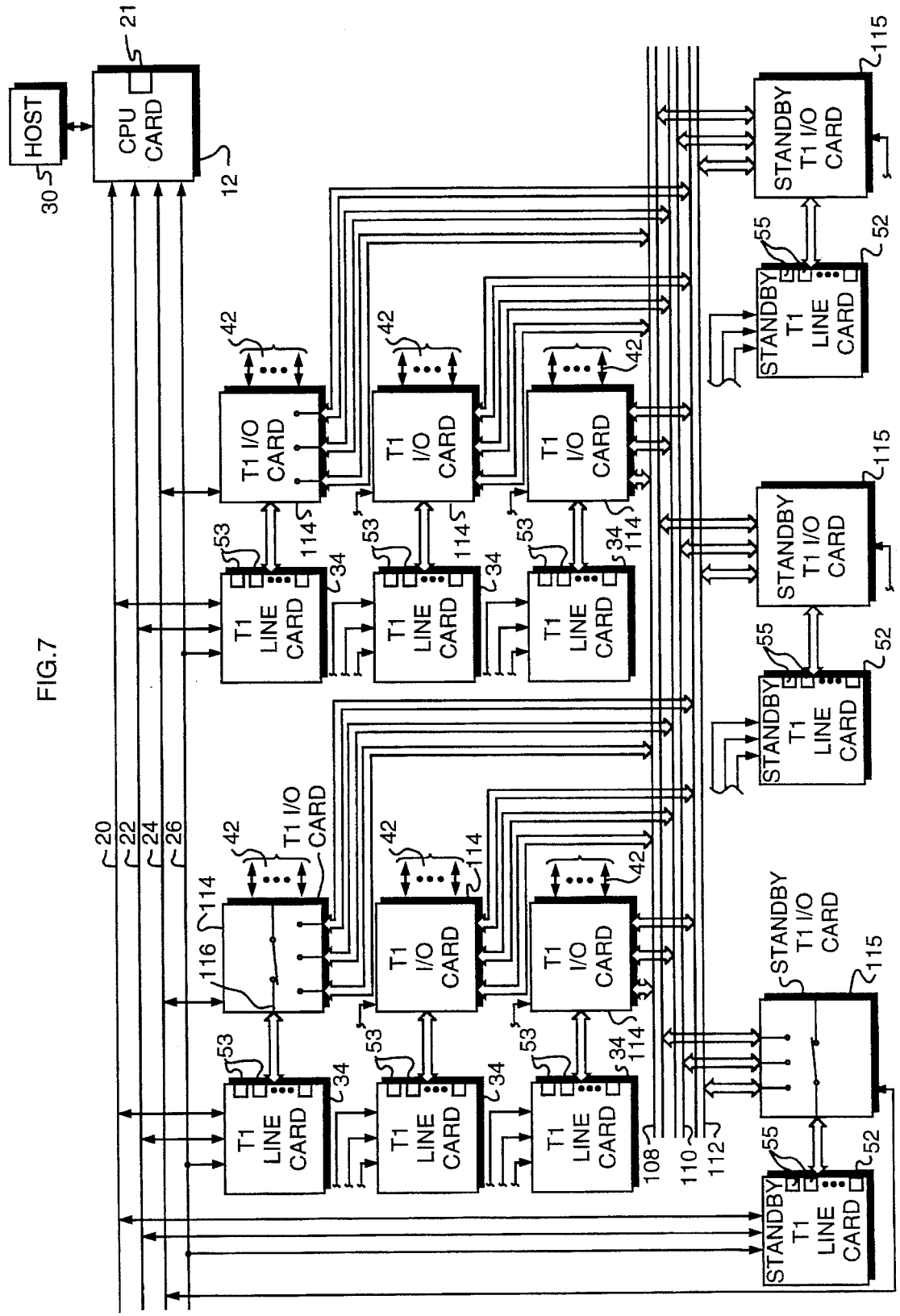
FIG. 7 is a schematic view of the line cards and I/O cards of an alternative embodiment of the telecommunications switch of FIG. 1.

FIG. 7 shows another embodiment of the present invention in which the switch includes multiple I/O busses 108,110,112 to provide multiple redundancy to the line cards. In this embodiment, the number of I/O busses is three, but it should be understood that the number of I/O busses may be as high as the number of different standby line cards. Also, the active line cards in FIG. 7 are all T1 line cards 34 because, as will be shown, the multiple I/O bus embodiment is most beneficial when most or all of the line cards are of the same protocol type.

Each of the T1 line cards 34 is serviced by an I/O card 114. When the system is operating normally (i.e. when there are no line card failures), each of the I/O cards 114 connects its line card to a set of T1 spans 42. The I/O cards 114 are identical to the T1 I/O cards 40 of FIG. 2, except that they are equipped to switch the T1 data from the spans 42 to T1 line card 34 or to any of three alternative outputs. This capability is depicted schematically in one of the I/O cards 114 of FIG. 7 by a single-pole quadruple-throw switch 116. In the preferred embodiment, the switching function is performed by relays. However, any alternative switching device may be used instead.

The three alternative outputs of each I/O card 114 are connected to three different I/O busses 108,110,112. Each of the I/O busses is also connected to three standby I/O cards 115, each of which is dedicated to a standby T1 line card 52. All of the I/O cards are individually addressed as in the previous embodiment, and are recognized by the CPU card 12 as being in either active mode or standby mode.

When one of the line card 34 fails, the CPU detects the failure and sends a failure message to the host 30. When a valid switchover message is received from the host, the CPU then instructs one of the standby I/O cards 115 to switch its relays so that the standby line card 52 which it serves is connected to one of the busses 108,110,112. For example, if the upper left line card 34 in FIG. 7 were to fail, the CPU card 12 could instruct the leftmost standby I/O card 115 shown in the figure to switch its relays to connect its standby line card 52 to I/O bus 112. The CPU would then instruct the I/O card 114 serving the failed line card to switch its relays to connect the T1 data stream to I/O bus 112. The leftmost standby line card 52 could then service the switched data stream via I/O bus 112.

If, while the upper left line card was still inoperative, the lower right line card 34 of FIG. 7 were to fail, this data stream could also be rerouted, due to the availability of additional I/O busses 108,110. For example, the CPU, upon detecting the new error, could report to the host 30 and receive a switchover message to instruct the rightmost standby I/O card 115 of FIG. 7 to switch its relays to connect its standby line card 52 to bus 108. The CPU may then instruct the I/O card 114 serving the newly failed line card to switch its relays to connect the T1 data stream to bus 108. The rightmost standby line card 52 could then service this data stream via bus 108.

It should be apparent that the embodiment shown in FIG. 7 is capable of handling still a third simultaneous line card failure before reaching its redundancy limit. The alternative of using additional I/O busses gives additional depth to the redundancy of the line cards. The number of additional busses is limited only by the number of standby line cards, since each I/O bus is necessary only if there is an available standby line card to service the data stream of the failed line card.

Providing pairs of standby I/O cards and standby line cards which exceed the number of I/O busses is also contemplated by the present invention. Such an arrangement provides redundancy for the standby cards, without providing additional redundancy for the active line cards. For example, if the switch of FIG. 7 included only one I/O bus, but nonetheless had three standby I/O cards 115 and three standby line cards 52, only one active line card failure could be tolerated at a time. However, if a standby line card was put into service by the failure of a line card 34, and then itself failed, the data stream could be switched onto a second standby line card connected to the I/O bus.

The example of FIG. 7 used only T1 type line cards. This is because the use of additional I/O busses is most beneficial in a switch which has many line cards of the same protocol (i.e. T1, E1 or J1). This is understood when it is recognized that when line cards of different protocols are used in the same switch (as in FIGS. 1 and 2), corresponding standby line cards of the same types are needed to provide redundancy. That is, if a T1 line card fails, a T1 standby line card is needed to replace it. Similarly, if an E1 line card fails, an E1 standby line card is needed to replace it. Thus, if a system has both T1 and E1 line cards, and the system is to continue operating if any two line cards fail, a total of four standby line cards, two for each of the T1 and E1 protocol types, must be provided in addition to the two I/O busses. Furthermore, a standby I/O card for each of these standby line cards must also be provided. This is a total of six cards (standby line cards and standby I/O cards) which are necessary to provide a two-level redundancy. As shown in FIG. 7, with only one protocol type, the same number of cards provides a three-level redundancy. Obviously, if T1, E1 and J1 line card types are to be provided in the same switch, multiple redundancy becomes even more costly in the number of cards required.

Another alternative embodiment involves the switching of only some of the incoming spans of an I/O card onto a standby line card. Since each line card handles each data stream of a span (such as a T1 span) using an individual set of circuit components (or "line module") and each such individual data stream can be switched by an individual relay of an I/O card, it is possible to isolate an individual data stream to be switched by the I/O card when the line modules handling that data stream has failed. For example if, in FIG. 7, a line module 53 on a T1 line card 34 which was handling the data stream of one T1 span 42 terminated by I/O card 114 was to fail, the CPU card 12 could instruct the I/O card 114 to switch only the relays that carried that data stream onto an I/O bus such as I/O bus 108. One line module 55 on standby T1 line card 52 could then be connected to I/O bus 108 by the CPU instructing standby I/O card 115 to switch only the relays that connected to that line module 55 of the standby line card. That line module could then be configured by the host to handle the data stream corresponding to that one individual T1 span.

A considerable advantage of this embodiment is the ability to handle isolated failures of line modules on different line cards using a single standby line card and a single I/O bus. Continuing with the example above, if after the first line module 53 failure a line module on another line card 34 were to fail, the span which was affected by this subsequent failure could also be switched onto the same I/O bus 108. This is accomplished by switching, on the I/O card servicing the line card having the newly failed line module, the individual relays which carry the data stream of the span to be switched onto I/O bus 108. By properly configuring one of the available line modules 55 of the same standby line card 52 which is receiving the first diverted data stream, the second diverted data stream can also be handled. On the same standby I/O card 115, a different set of relays is switched to connect to the conductors of I/O bus 108 onto which this new data stream is diverted. Thus, a second line module 55 of the line card 52 is configured by the host to handle the new data stream.

In this embodiment, the detection of the failure of a single line module comes, preferably, from a message to the CPU card 12 issued by the line card containing the failed module. The ability to switch only the data stream of a single span gives additional redundancy in that the failure of a single line module 53 does not result in the occupation of an entire I/O bus and standby line card. Thus, while in some circumstances the failure of an entire line card requires the switching of all the I/O card relays, isolated failures of line modules may be handled independently with less cost to the system redundancy. Those skilled in the art will recognize that the technique of switching individual data streams for the failure of a single line module 53 can be combined with each of the previous embodiments to further improve the redundancy of the switch in each.

It should be apparent that all of the components of the switches of the preferred embodiments have redundancy features. In other words, these embodiments describe fully redundant switches. If any component of the switch fails, there is a backup component which automatically replaces it. This full redundancy creates a highly tolerant switch which continues functioning when faced with individual component failure. This greatly reduces the possibility of lost telecommunications connections and minimizes switch down time. Furthermore, the ability to manually switch over from one line card to a standby line card without any significant disruption of service, coupled with the hot insertability of all the cards, allows line cards to be removed for servicing or upgrade and replaced while the switch is operational. If a manual switchover were desired, a standby line card could be pre-configured so the time that the incoming data stream was not being serviced would be very short.

What is claimed is:

1. A programmable telecommunications switch comprising:

a switching matrix for dynamically connecting and disconnecting communications paths between a plurality of communication channels:

a first line module configured to receive at least one telecommunications signal of a certain protocol type and transmit the telecommunications signal to a first communication channel of the plurality of communications channels of the switching matrix, wherein the first line module is independently instructable to transmit to any one of the plurality of communication channels:

a second line module configured to receive at least one telecommunications signal of said certain protocol, wherein the second line module is independently instructable to transmit a received telecommunications signal to any one of the plurality of communication channels;

an active input device configured to terminate an external span having at least one conductor carrying at least one telecommunications signal of said certain protocol type, the active input device having a plurality of connection modes, a first mode being such that the span is connected in a communicating relationship to the first line module and a second mode being such that the span is connected in a communicating relationship to the second line module, the active input device changing from the first mode to the second mode in response to a changeover signal; and a data processor configured to respond to a malfunction of the first line module by instructing the second line module to transmit received telecommunications signals to the first communication channel and generating the changeover signal, thereby causing the first line module to be functionally replaced by the second line module.

2. A switch according to claim 1 wherein the first fine module is located on a printed circuit board adapted to be physically inserted and removed from the switch.

3. A switch according to claim 2 wherein the printed circuit board further comprises an edge connector configured to enable the first line module to make an electrical connection with the data processor and the active input device.

4. A switch according to claim 2 further comprising:

a main power source from which the switching matrix, the first line module, the second line module, the active input device and the data processor all receive electrical power; and a pre-charge power source which, upon insertion of the circuit board, provides power to the first line module before the first line module receives power from the main power source.

5. A switch according to claim 1 further comprising:

a standby input device coupled to and associated with the second line module;

an input/output (I/O) bus configured to couple the standby input device with the active input device;

whereby the standby input device has a plurality of connection modes, a first mode of the standby input device connecting the I/O bus to the second line module and a second mode of the standby input device disconnecting the I/O bus from the second line module, the standby input device changing from the first mode to the second mode in response to a standby signal generated by the data processor.

6. A switch according to claim 5 wherein the first line module is part of a first line card having a plurality of line modules and the second line module is part of a second line card having a plurality of line modules.

7. A switch according to claim 5 wherein the standby input device is a first standby input device and the standby signal is a first standby signal, and wherein the switch comprises a plurality of the first and second line modules and a plurality of standby input devices, each standby input device connecting an associated second line module to the I/O bus in a first connection mode and disconnecting the associated second line module from the I/O bus in a second connection mode, the changing of each standby input device from its first mode to its second mode being in response to one of a plurality of distinct standby signals generated by the data processor.

8. A switch according to claim 7 wherein the active input device is one of a plurality of active input devices each terminating a span carrying a telecommunications signal and wherein the different line modules are grouped together on line cards such that each of the line modules on a single line card services a different external span.

9. A switch according to claim 7 wherein the active input device is one of a plurality of active input devices each terminating a span carrying a telecommunications signal and wherein the plurality of line modules includes line modules servicing telecommunication signals using different signaling protocols.

10. A switch according to claim 1 wherein the data processor is a microprocessor.

11. A programmable telecommunications switch comprising:

a switching matrix for dynamically connecting and disconnecting communications paths between a plurality of communication channels;

a first line card configured to receive telecommunications signals and transmit the telecommunications signals to predetermined ones of said plurality of communication channels of the switching matrix, wherein the first line card is independently instructable to transmit to any of the plurality of communication channels;

a second line card configured to receive said telecommunications signals and further configured to be independently instructable to transmit the telecommunications signals to predetermined ones of said plurality of communication channels of the switching matrix an input/output I/O bus configured to carry telecommunications signals;

an active I/O card, coupled to and associated with the first line card, configured to terminate a plurality of external spans carrying telecommunications signals and which has a plurality of connection modes, a first mode connecting the external spans in a communicating relationship to the first line card and a second mode connecting the spans in a communicating relationship to the I/O bus, the active I/O card changing from one mode to the other in response to a changeover signal;

a standby I/O card having a plurality of connection modes, a first connection mode connecting the second line card in a communicating relationship to the I/O bus, and a second mode disconnecting the second line card from the I/O bus, the standby I/O card changing from one mode to another in response to a standby signal; and a data processor configured to instruct the second line card to transmit said received telecommunications signals to the same predetermined one of said communication channels previously used by the first line card and to generate the changeover signal and the standby signal to functionally replace the first line card with the second line card.

12. A switch according to claim 11 wherein, when the active I/O card is in the second mode and the standby I/O card is in the first mode, the first line card can be removed from the switch without disrupting the operation of the switch.

13. A programmable telecommunications switch comprising:

a switching matrix for dynamically connecting and disconnecting communications paths between a plurality of communication channels;

a plurality of independently instructable and functionally compatible line cards, coupled to the switching matrix, each of the plurality of line cards configured to receive at least one telecommunications signal and transmit the received telecommunications signal to one or more of the plurality of communication channels of the switching matrix, each line card further configured to transmit the received telecommunications signal to one or more of the plurality of communication channels of the switch in accordance with an externally generated instruction; a plurality of active input/output I/O cards each of which terminates a plurality of external spans carrying telecommunications signals and each of which has a plurality of connection modes including a first mode in which the spans are connected in communicating relationship with an associated one of said plurality of line cards, the mode of each active I/O card being changeable in response to one of a plurality of distinct changeover signals each specific to a different active I/O card;

a plurality of I/O busses arranged such that each active I/O card connects the spans it terminates to a different one of said I/O busses for each of its connection modes other than the first mode;

a plurality of standby I/O cards each having a plurality of connection modes and being arranged such that different connection modes of a standby I/O card correspond to a line card by that standby I/O card being connected to a different one of the I/O busses, the connection mode of each standby I/O card being changeable in response to one of a plurality of distinct standby signals each specific to a different standby I/O card; and a data processor, responsive to a malfunctioning line card transmitting the telecommunications signal to a first communication channel of the switch matrix configured to generate an instruction signal to an operational one of the plurality of line cards to transmit the telecommunications signal to the same communication channels of the switch matrix previously used by the malfunctioning card, and to generate a particular one of the changeover signals and a particular one of the standby signals to functionally replace the malfunctioning line card with the operational line card.

14. A switch according to claim 13 wherein the particular standby signal causes a designated standby I/O card to connect the operational line card associated with such standby I/O card to a designated I/O bus, and the particular changeover signal causes an active I/O card which is associated with the malfunctioning line card to connect the spans terminated on such active I/O card to said designated I/O bus.

15. A programmable telecommunications switch having a switching matrix for dynamically connecting and disconnecting communication paths between a plurality of communication channels, a first line module arranged to receive at least one telecommunications signal and transmit the telecommunications signal to the switching matrix, and a second line module arranged to receive at least one telecommunications signal and transmit the telecommunications signal to the switching matrix, each of the line modules being functionally compatible and independently instructable to transmit a received telecommunications signal to any one of the plurality of communication channels, the switch comprising:

an input device configured to terminate an external span having at least one conductor carrying at least one telecommunications signal, the input device having a plurality of connection modes, a first mode being such that the span is connected in a communicating relationship to the first line module and a second mode being such that the span is connected in a communicating relationship to the second line module, the input device changing from the first mode to the second mode in response to a changeover signal; and a data processor configured to respond to a malfunction of the first line module by instructing the second line module to transmit received telecommunications signals to the switching matrix and further configured to generate the changeover signal to functionally replace the first line module with the second line module.

16. A switch according to claim 15 further comprising:

an I/O bus located such that when the active input device is in the second mode, the span is in electrical communication with the I/O bus; and a standby input device having a plurality of connection modes, a first mode of the standby input device connecting the I/O bus to the second line module and a second mode of the standby input device disconnecting the I/O bus from the second line module, the standby input device changing from the first mode to the second mode in response to a standby signal generated by the data processor in response to said malfunction of the first line module.

17. A switch according to claim 16 further comprising:

a first line card on which a plurality of line modules are located including the first line module; and a second line card on which a plurality of line modules are located including the second line module.

18. A switch according to claim 17 wherein the first line card comprises a circuit board having an edge connector by which the modules of the first line card make electrical connection with the data processor and the active input device and wherein the second line card comprises a circuit board having an edge connector by which the modules of the second line card make electrical connection with the data processor and the active input device.

19. In a programmable telecommunications switch, having a switching matrix for dynamically connecting and disconnecting communication paths between a plurality of communication channels and a first independently instructable line module arranged to receive a telecommunications signal and transmit the telecommunications signal to a first predetermined communication channel of said plurality of communication channels of the switching matrix, a method of rerouting the telecommunications signal upon a malfunction of the first line module, the method comprising:

providing a second independently instructable line module functionally compatible with the first line module, arranged to receive said telecommunications signal and transmit the telecommunications signal to said plurality of communication channels of the switching matrix in accordance with an instruction signal;

providing an active input device which terminates an external span carrying the telecommunications signal and which has a plurality of connection modes, a first mode being such that the span is connected in a communicating relationship to the first line module and a second mode being such that the span is connected in a communicating relationship to the second line module, the active input device changing from the first mode to the second mode in response to a changeover signal;

providing a data processor which is responsive to a malfunction of the first line module;

generating, by the data processor, an instruction signal to the second line module to cause the second line module to transmit said telecommunications signal over said first communication channel of the switching matrix; and generating the changeover signal with the data processor in response to a malfunction of the first line module, thereby decoupling the first line module from the switch matrix and functionally replacing the first line module with the second line module, the second line module thereafter transmitting the telecommunications signal to said first communication channel of the switch matrix.

20. A method according to claim 19 further comprising locating the first line module on a printed circuit board which may be physically inserted and removed from the switch.

21. A method according to claim 20 further comprising providing the circuit board with an edge connector by which the first line module makes electrical connection with the data processor and the active input device.

22. A method according to claim 20 further comprising:

providing a main power source from which the switching matrix, the first line module, the second line module, the active input device and the data processor all receive electrical power; and providing a precharge power source which, upon insertion of the circuit board, provides power to the first line module before the first line module receives power from the main power source.

23. A method according to claim 19 further comprising:

connecting the span to the second line module via an I/O bus and a standby input device when the active input device is in the second mode, the standby input device having a plurality of connection modes, a first mode of the standby input device connecting the I/O bus to the second line module and a second mode of the standby input device disconnecting the I/O bus from the second line module; and generating a standby signal with the data processor which changes the standby input device from the first mode to the second mode in response to a malfunction of the first line module.

24. A method according to claim 23 further comprising:
- locating the first line module on a first line card which has a plurality of line modules; and
- locating the second line module on a second line card which has a plurality of line modules.

25. In a programmable telecommunications switch having a switching matrix for dynamically connecting and disconnecting communications paths between a plurality of communication channels, first and second functionally compatible and independently instructable line cards arranged to receive telecommunications signals and transmit the telecommunications signals to a selected one of the plurality of communication channels of the switching matrix, a method of rerouting a telecommunications signal from the first line card to the second line card, wherein the first line card is transmitting the telecommunications signal to a first communication channel, the method comprising:

- providing an I/O bus arranged to carry telecommunications signals;
- providing an active I/O card which terminates a plurality of external spans carrying telecommunications signals and has a plurality of connection modes, a first mode connecting the spans in a communicating relationship to the first line card, and a second mode connecting the spans in a communicating relationship to the I/O bus;
- providing a standby I/O card having a plurality of connection modes, a first connection mode connecting the second line card in a communicating relationship to the I/O bus, and a second mode disconnecting the second line card from the I/O bus;
- providing a data processor which is responsive to a malfunction of the first line card;
- instructing the second line card to transmit the telecommunication signal to said first communication channel; and
- generating with the data processor, upon malfunction of the first line card, a standby signal which is received by the standby I/O card and causes the standby I/O card to change from one mode to another, and a changeover signal which is received by the active I/O card and causes the active I/O card to change from one mode to the other to functionally replace the first line card with the second line card, the telecommunications signal thereafter received by the second line card and transmitted by the second line card to the first communication channel of the switch matrix.

26. In a programmable telecommunications switch having a switching matrix for dynamically connecting or disconnecting communications paths between a plurality of communication channels and a plurality of functionally compatible and independently instructable line cards each arranged to receive a telecommunications signal and transmit the telecommunications signal to a selectable one of the plurality of communication channels of the switching matrix, a method of providing redundancy to the line cards, the method comprising:

- providing a plurality of active I/O cards, each of which terminates a plurality of external spans carrying telecommunications signals and each of which has a plurality of connection modes including a first mode in which it connects the spans to a line card associated with that active I/O card;
- providing a plurality of I/O busses arranged such that each active I/O card connects the spans it terminates to a different one of said I/O busses for each of its connection modes other than the first mode;
- providing a plurality of standby I/O cards each having a plurality of connection modes and being arranged such that different connection modes of a standby I/O card correspond to a line card associated with that standby I/O card being connected to a different one of the I/O busses;
- providing a data processor which is responsive to a malfunction of one of the line cards, the malfunctioning line card configured to transmit the telecommunications signal to a first communication channel of the switch matrix;
- generating with the data processor, in response to a malfunction of one of the line cards, a distinct changeover signal specific to a particular active I/O card associated with the malfunctioning line card to change the mode of said particular active I/O card, and a distinct standby signal specific to a particular standby I/O card to change the connection mode of said particular standby I/O card, the resulting mode change of the particular I/O card and standby I/O card resulting in the spans terminated on the particular I/O card being connected to a designated I/O bus and the particular standby I/O card connecting the line card with which it is associated to said designated I/O bus; and
- instructing the line card associated with the particular standby I/O card to transmit the telecommunications signal to the first communication channel of the switch matrix.

* * * * *